United States Patent
Stemmer

(10) Patent No.: US 9,718,363 B2
(45) Date of Patent: Aug. 1, 2017

(54) MOTOR VEHICLE

(71) Applicant: AUDI AG, Ingolstadt (DE)

(72) Inventor: Martin Stemmer, Niederding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/106,643

(22) PCT Filed: Dec. 16, 2014

(86) PCT No.: PCT/EP2014/003362
§ 371 (c)(1),
(2) Date: Jun. 20, 2016

(87) PCT Pub. No.: WO2015/090557
PCT Pub. Date: Jun. 25, 2015

(65) Prior Publication Data
US 2017/0008401 A1 Jan. 12, 2017

(30) Foreign Application Priority Data

Dec. 21, 2013 (DE) .................. 10 2013 021 872

(51) Int. Cl.
*B60L 3/00* (2006.01)
*B60L 7/26* (2006.01)
(Continued)

(52) U.S. Cl.
CPC ........... *B60L 3/0076* (2013.01); *B60L 3/0023* (2013.01); *B60L 7/26* (2013.01); *B60L 15/2009* (2013.01);
(Continued)

(58) Field of Classification Search
CPC ........ B60L 3/0023; B60L 3/0076; B60L 7/26; B60L 15/2009; B60L 2260/28; B60T 13/586
See application file for complete search history.

(56) References Cited

U.S. PATENT DOCUMENTS 6,449,551 B1 * 9/2002 Wrede ................... B60T 8/00
303/20
2001/0045771 A1 * 11/2001 Corio .................. B60T 8/1703
303/20
(Continued)

FOREIGN PATENT DOCUMENTS

DE 10 2009 047 612 A1 6/2011
DE 10 2011 110 892 A1 2/2013
(Continued)

OTHER PUBLICATIONS

Lehner et al., Method for Braking a vehicle comprising an electric drive motor, Jun. 16, 2011, WIPO, WO 2011/069724 A1, English Abstract.*

(Continued)

*Primary Examiner* — James A English
(74) *Attorney, Agent, or Firm* — Henry M. Feiereisen LLC

(57) ABSTRACT

The invention relates to a motor vehicle comprising: a number of wheels; a brake system having hydraulically actuatable brakes corresponding to each wheel; at least one brake circuit via which the brakes can be actuated; a brake booster via which the brake circuit can be operated, said brake booster being actuatable via a brake pedal to be actuated by the driver; and at least one pressure generation device and/or pressure accumulator device, which can be controlled by a control device, and via which the hydraulic pressure inside the brake circuit can be modulated. At least one electric motor (9) is provided, which motor is used in the event of a detected failure inside the brake system (2) to generate a deceleration torque by automatically switching into a generator operation, in order to brake the vehicle (1) until same has reached a standstill.

8 Claims, 1 Drawing Sheet

(51) Int. Cl.
 *B60L 15/20* (2006.01)
 *B60T 1/10* (2006.01)
 *B60T 8/88* (2006.01)
 *B60T 13/58* (2006.01)
 *B60W 20/50* (2016.01)

(52) U.S. Cl.
 CPC ............... *B60T 1/10* (2013.01); *B60T 8/885* (2013.01); *B60T 13/586* (2013.01); *B60L 2220/44* (2013.01); *B60L 2240/423* (2013.01); *B60L 2250/16* (2013.01); *B60L 2250/26* (2013.01); *B60L 2260/26* (2013.01); *B60L 2260/28* (2013.01); *B60T 2270/402* (2013.01); *B60T 2270/604* (2013.01); *B60W 20/50* (2013.01); *Y02T 10/645* (2013.01); *Y02T 10/72* (2013.01); *Y02T 10/7275* (2013.01); *Y10S 903/947* (2013.01)

(56) References Cited

U.S. PATENT DOCUMENTS

2009/0315391 A1* 12/2009 Tanaka ................. B60T 8/3655
 303/113.5
2011/0108375 A1* 5/2011 Wuerth ................. B60T 8/1766
 188/106 P
2012/0193154 A1 8/2012 Wellborn et al.
2014/0371974 A1 12/2014 Huelsebusch et al.

FOREIGN PATENT DOCUMENTS

| | | |
|---|---|---|
| DE | 10 2011 084 606 A1 | 4/2013 |
| DE | EP 2 594 446 A2 | 5/2013 |
| EP | 2 594 446 A2 | 5/2013 |
| WO | WO-2011069724 A1 * | 6/2011 |

OTHER PUBLICATIONS

Lehner et al., Method for Braking a vehicle comprising an electric drive motor, Jun. 16, 2011, WIPO, WO 2011/069724 A1, Machine Translation of Description.*

Guenter Fendt, Brake system for motor vehicle e.g. passenger car, has hydraulic brake unit that is provided in brake device, and electric parking brake portion provided with actuator which is actuated based on activation commands, German Patent Office, DE 10 2011 110 892 A1, Machine Translation of Description.*

International Search Report issued by the European Patent Office in International Application PCT/EP2014/003362.

* cited by examiner

MOTOR VEHICLE

CROSS-REFERENCES TO RELATED APPLICATIONS

This application is the U.S. National Stage of International Application No. PCT/EP2014/003362, filed Dec. 16, 2014, which designated the U.S. and has been published as International Publication No. WO 2015/090557 and which claims the priority of German Patent Application, Serial No. 10 2013 021 872.1, filed Dec. 21, 2013, pursuant to 35 U.S.C. 119(a)-(d).

BACKGROUND OF THE INVENTION

The invention relates to a motor vehicle including several wheels and a brake system having hydraulically actuatable brakes associated to the wheels, respectively, at least one brake circuit via which the brakes can be actuated, a brake booster via which the brake circuit can be operated, wherein the brake booster can be actuated via a brake pedal actuated by the driver, and at least one pressure generating and/or pressure storage device which is controllable via a control device and via which the hydraulic pressure can be modulated within the braking circuit.

Motor vehicles generally have disk brakes assigned to the respective wheels, wherein drum brakes are sometimes also installed. The brakes are actuated via a hydraulic brake circuit which, in turn, is operated via a brake booster in order to generate the necessary hydraulic pressure. A brake booster is hereby to be understood as including brake pressure generating devices without and with modulation devices, which are used for the provision of ABS and ESC functions. The brake booster, in turn, is coupled in known motor vehicles to the brake pedal, wherein the brake pedal typically is part of a foot lever system on which at least an accelerator pedal or, optionally, a clutch pedal is provided.

Such known braking systems are nowadays designed fail-safe. This means that when a fault occurs in the braking system itself or in a system component such as, for example, corresponding actuating elements, within the communications link to controllers etc., or the energy supply, the braking system is ultimately deactivated. In this context, braking system is understood to be the brake booster and the brake control, usually with the main functions of ABS (anti-lock braking system) and ESC (electronic stability control). This means that these functions are no longer available, sometimes also the brake booster no longer operates normally. The driver thereby serves as a fallback. In case of failure, he assumes the task of braking the motor vehicle by increased force which he introduces via the brake pedal, consequently to build up the required brake pressure. The driver has to stabilize the motor vehicle himself and select a suitable travel mode in order to control and brake it in case of a failure. This means that the driver is included as a fallback in the security concept.

Modern motor vehicles already allow semi-autonomous driving, thus driving in which the driver is at least in part no longer involved in the motor vehicle guidance. Development increasingly is aimed in a direction of relieving the driver as much as possible towards piloted, respectively predominantly autonomous driving. That means that the vehicle including the respective control is automatically capable to guide the motor vehicle longitudinally and transversely without the need for involving the driver. He can attend to other things. With increasing scope of piloted driving, the demands on safety-relevant motor vehicle systems however also increase, which then need no longer be configured "fail-safe", but "fail-operational", because they must be able to guide the motor vehicle autonomously, even in the case of a fault, for at least a certain bridging period, that is until the driver himself is actively involved in the driving operation again. This means that the "fail-operational" control must be configured such as if the driver was still actively involved in its entirety. Currently known braking system architectures however, do not allow the realization of such a "fail-operational" behavior since they are still geared to the driver as a fallback.

SUMMARY OF THE INVENTION

The invention is thus based on the problem to provide a motor vehicle which allows a "fail-operational" mode with simply conceived configuration of the braking system.

This problem is solved in a motor vehicle of the aforementioned type in accordance with the invention by providing at least one electric motor, via which in the event of a malfunction detected within the braking system, a deceleration torque for braking the vehicle to a standstill can be generated through automatic switching to a regenerative mode.

When detecting in a motor vehicle according to the invention any type of fault within the braking system that is likely to cause or causes the latter in part or in its entirety to incorrectly operate, the electric motor generates a deceleration torque, without requiring intervention by the driver in any way in order to slow down the vehicle in a desired manner, specifically at a maximum to a standstill. For this purpose, the at least one electric motor is switched to a regenerative mode in which it operates as generator. This requires to power the electric motor so that its rotor is moving. As the electric motor is integrated in any manner at the drive side or chassis side, i.e. connected with a rotating element which is necessarily caused to rotate as the vehicle rolls, the rotation of the rotor thus generates in the regenerative mode a deceleration torque on the drive side or chassis side and thereby necessarily slows down the vehicle.

Switching to the regenerative mode and thus to the generation of the deceleration torque and resultant forced braking action of the vehicle is implemented automatically as soon as a respective malfunction is sensed. The driver, who in the at least semi-autonomous mode does not have control over the vehicle at this moment, is not required to intervene, i.e. the driver is not intended as fallback in the motor vehicle according to the invention. Rather, switching is executed automatically, as described, thereby establishing a "fail-operational" design. As a result of the automatically forced deceleration via the electric motor, the driver, who, of course, is prompted to assume control of the vehicle in the event a malfunction is detected, is provided with adequate time to assume control, while at the same time the vehicle is decelerated automatically and actively and at a maximum brought to a standstill. The design is hereby such that the vehicle can in fact be decelerated in this emergency situation to standstill.

During normal operation of the brake system in the semi-autonomous mode, the brake system is able to directly implement the demands of the assist systems, i.e. for example for realization of an ABS function or an anti-slip control, and to for example respectively slow down the vehicle in a controlled manner via the ESC block. The vehicle is decelerated by a pressure buildup, e.g. by the pump of the ESC block. The brake system including the incorporated components are hereby capable to detect a respective operational fault, e.g. via a status notification or a communication monitoring, etc. When detecting such a malfunction, it is automatically switched to "emergency run", since the brake system is no longer able to fulfill the assigned tasks as a result of the malfunction. The electric motor is immediately activated and switched to a regenerative mode so as to generate the corresponding deceleration torque.

According to a first alternative of the invention, the electric motor can be integrated into the drive train of the motor vehicle and provided to power the motor vehicle configured as hybrid vehicle or electric vehicle. In this configuration of the invention, the motor vehicle includes from the beginning an electric motor which serves as traction battery and powers the vehicle, either temporarily when a hybrid vehicle is involved, or exclusively when an electric vehicle is involved. The electric motor may hereby work upon both axles, i.e. front axle and rear axle, or only upon one axle. In the event of a malfunction, the electric motor is switched in response to this fault detection signal via a respective control device, irrespective as to whether the electric motor is in power mode or at rest.

The electric motor can, as described, power an axle, in particular the front axle. It is also conceivable to configure the electric motor as wheel-hub motor, in which case provision is made for a respective wheel-hub motor on at least two wheels. In any event, regardless as to their location, the electric motors are integrated in the respective drive train.

As an alternative, it is conceivable to use the electric motor solely as deceleration element, i.e. not to directly integrate it in the drive train or at least not in a way that it provides traction. The electric motor is associated in this case to a wheel, preferably such an electric motor is associated to at least two wheels, to produce the deceleration torque.

In the event an electromechanical parking brake device is provided, the latter may be integrated in a particularly advantageous manner for vehicle deceleration in the presence of malfunction or emergency case. In accordance with the invention, this electromechanical parking brake device can be operated automatically for additional deceleration as the electric motor is switched over or after having been switched over. Such an electromechanical parking brake device acts predominantly on both rear wheels. It is independent from the brake system and operates via separately activated actuators which operate either the brakes there as such, or additional brake elements. In particular, when the electric motor powers the front axle, an additional deceleration of the rear wheel is appropriate, but of course also in all other afore-described cases. It is conceivable, after having integrated a separate system with the electromechanical parking brake device, to provide an own control device for redundant detection of the possible malfunction and to compute the respective control parameters in order to then activate the parking brake device. As an alternative, it is, of course, also conceivable to activate the parking brake device in this case via the control device which controls the electric motor.

Finally, it is suitable to maintain the vehicle at a standstill via an electronic parking brake device or transmission lock, after the vehicle has been brought to standstill, i.e. either the parking brake device or the transmission lock is automatically activated after stoppage has been realized.

BRIEF DESCRIPTION OF THE DRAWING

Further advantages, features and details of the invention will become apparent from the exemplary embodiment described in the following and from the drawing. It is shown in.

DETAILED DESCRIPTION OF PREFERRED EMBODIMENTS

Figure 1:
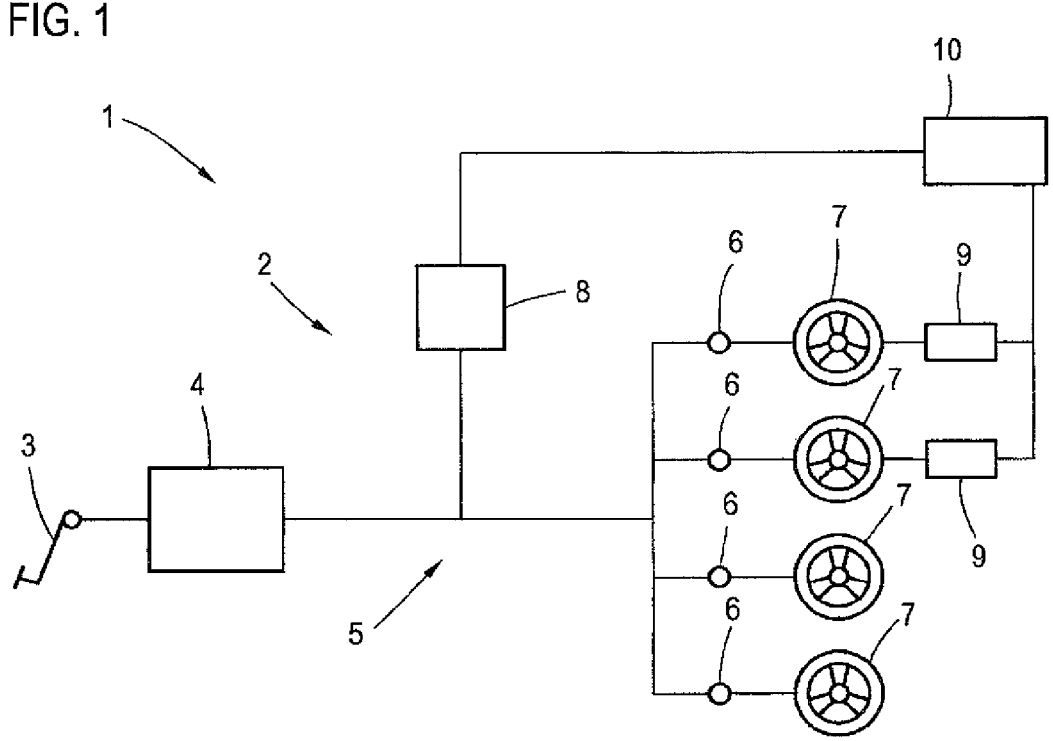
FIG. 1 a basic representation of a first embodiment of a motor vehicle according to the invention, depicting only relevant elements, and FIG. 2 a representation of a second embodiment of a motor vehicle according to the invention

The Figure shows in the form of a basic representation a motor vehicle 1 according to the invention, wherein only the braking system 2 is shown here, including a brake pedal 3, which is to be actuated by the driver and acts upon a brake booster 4. The latter operates a hydraulic brake circuit 5, which, in turn, acts on the individual brakes 6 which are associated to wheels 7, respectively. The brakes 6 are configured for example as disk brakes or drum brakes.

A part of the brake system 2 is furthermore a pressure generating and/or pressure storage device 8, primarily in the form of an ESC block. Such an ESC block includes in a manner known per se a valve block with a multiplicity of separately switchable valves, which lead to the respective brake lines. Further provided is a pump device, via which the pressure of hydraulic fluid, which is distributed by the valves in the brake system including the brake circuit 5, is varied, as well as a corresponding control device which controls the valves and the pump. Structure and operation of such an ESC block is known. Even though only one brake circuit 5 is provided here, redundant provision is normally made in known manner for two such brake circuits. The Figure is a purely schematic representation for the sole purpose to describe the basic operation in accordance with the invention.

In the exemplary embodiment shown here, provision is made for two electric motors 9 on two of the wheels 7, for example the front wheels, which electric motors can be activated via a common control device 10. The electric motors 9 involve, for example, wheel-hub motors which provide traction in the vehicle which is designed here as electric vehicle.

The control device 10 communicates with the pressure generating and/or pressure storage device 8, i.e. the ESC block including its control device. Of course, the control device 10 may also communicate with further elements of the brake system 2 and monitor in particular possible communication paths.

As soon as the ESC block 8 or the control device 10 detects any type of malfunction of one of the components of the brake system 2, or in case of the ESC block 8 one of its components, such as for example a valve or the like, the two electric motors 9 are immediately addressed by the control device 10, which receives this respective fault signal, to switch immediately to a regenerative mode. In this regenerative mode, the electric motors 9 apply a deceleration torque, causing the vehicle 1 to slow down. The vehicle 1 may hereby be brought to a standstill. Intervention by the driver of any kind is not required, rather the system spontaneously switches to this emergency stop or state of emergency operation and slows down the vehicle that has been controlled up to that point semi-autonomously. The driver receives a take-over request which prompts him to assume vehicle control again. This automatically induced, deceleration to switch the electric motor 9 into regenerative mode provides the driver with enough time to assume control, while the vehicle is actively slowed down at the same time to ensure the "fail-operational" mode.

Figure 2:
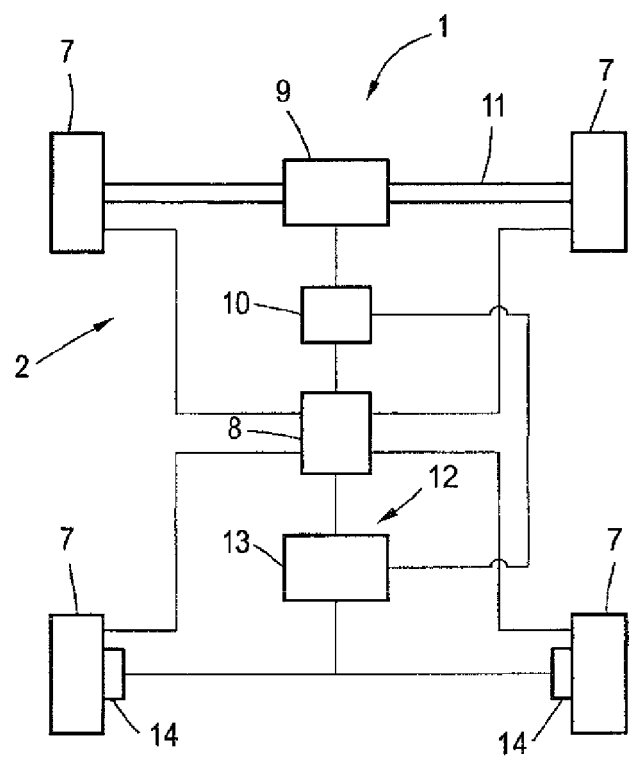

FIG. 2 shows a basic representation of a motor vehicle 1 according to the invention, wherein same reference signs are used for same components. The motor vehicle 1 includes again a brake system 2, wherein for sake of clarity the brake pedal 3 and the brake booster 4 are not shown here, but only the first pressure generating and/or pressure storage device 8, i.e. the ESC block, and the four wheels 7 with their also unillustrated associated brakes 6.

Provision is again made for an electric motor 9, which is arranged here as traction motor on the front axle 11 to power it. Associated thereto is again a control device 10 which communicates with the ESC block 8. In the event, a malfunction is again detected, the electric motor 9, when semi-autonomous driving has been selected by the driver beforehand, is immediately switched by the control device 10 into the regenerative mode so as to generate the deceleration torque and to slow down the vehicle in a defined manner. The control device 10 can hereby optionally also control the electric motor 9 in such a way that the deceleration torque is also built-up in a defined manner, and its height varied, to enable a quick but yet not sudden braking action.

Further provided is an electronic parking brake device 12, which includes a control device 13 and brake means 14 associated in the shown example to the two rear wheels 7 and including at least one actuator, which can be activated by the control device 13 and acts for example on the brake 6, or operates an own brake element. The control device 10 communicates with the control device 13. When detecting any kind of fault within the brake system 2, the electric motor 9 is switched to regenerative deceleration mode and the control device 10 sends at the same time a signal to the control device 13, which then additionally operates and activates the brake devices 14 so that deceleration is effected not only via the electric motor 9 but also via the parking brake device 12. The vehicle can thus be slowed down even faster.

Use of the parking brake device 12 makes it also possible, after the vehicle has been brought to a standstill, to maintain it in this situation. As an alternative, when the motor vehicle 1 involves a hybrid vehicle and includes in addition a combustion engine with respective transmission, to engage a transmission lock.

Even though it is generally possible to bring the vehicle via the examples shown only by way of example in FIGS. 1 and 2 to a standstill from the at least semi-autonomous travel without driver intervention, it is, of course, also conceivable, to terminate again the "emergency run situation", in which the one or the several electric motors are switched to regenerative deceleration mode, when the driver has assumed control over the vehicle again in response to a take-over request, received as a result of the detection of the malfunction and outputted in a respective display or acoustically, and thus has intervened actively either by steering or braking. Since, however, a malfunction situation is involved, it is appropriate to maintain also in this case the additional deceleration via the electric motors, optionally via the activated parking brake device. While braking to the standstill, a possibly existing transmission is optionally also automatically switched to neutral gear.

The invention claimed is:

1. A motor vehicle, comprising:
a plurality of wheels; and
a braking system including hydraulically actuatable brakes operably connected to the wheels in one-to-one correspondence, at least one brake circuit configured for actuation of the brakes, a brake booster operably connected to the brake circuit and actuated by a driver through actuation of a brake pedal, at least one pressure generating and/or pressure storage device which is configured for modulation of hydraulic pressure within the brake circuit for generating a pressure buildup by a pump of an electronic stability control (ESC) block, said ESC block including a valve block having a plurality of separately switchable valves, which lead to respective brake lines, and a control device configured to control the at least one pressure generating and/or pressure storage device;
at least one electric motor configured to generate a deceleration torque for braking the vehicle to a standstill through automatic switching into a regenerative mode, when a malfunction within the braking system is detected and the motor vehicle is at least in a semi-autonomous driving mode; and
an axle, said electric motor configured to power the axle.

2. The motor vehicle of claim 1, wherein the electric motor is integrated into a drive train of the motor vehicle and provided to power the motor vehicle which is designed as hybrid vehicle or electric vehicle.

3. The motor vehicle of claim 1, further comprising two of said electric motor operably connected to at least two of the wheels in one-to-one correspondence, each said electric motor being configured as wheel-hub motor.

4. The motor vehicle of claim 1, wherein the axle is a front axle.

5. The motor vehicle of claim 1, wherein the electric motor is operably connected to one of the wheels.

6. The motor vehicle of claim 1, wherein the electric motor is operably connected to at least two of the wheels.

7. The motor vehicle of claim 1, further comprising an electromechanical parking brake device configured to automatically provide additional deceleration with or after switching the electric motor into the regenerative mode.

8. The motor vehicle of claim 1, further comprising an electronic parking brake device or a transmission lock configured to automatically hold the vehicle in position, after the motor vehicle has been brought to the standstill.

* * * * *